April 21, 1959 G. A. LYON 2,883,239
WHEEL COVER
Filed June 2, 1955
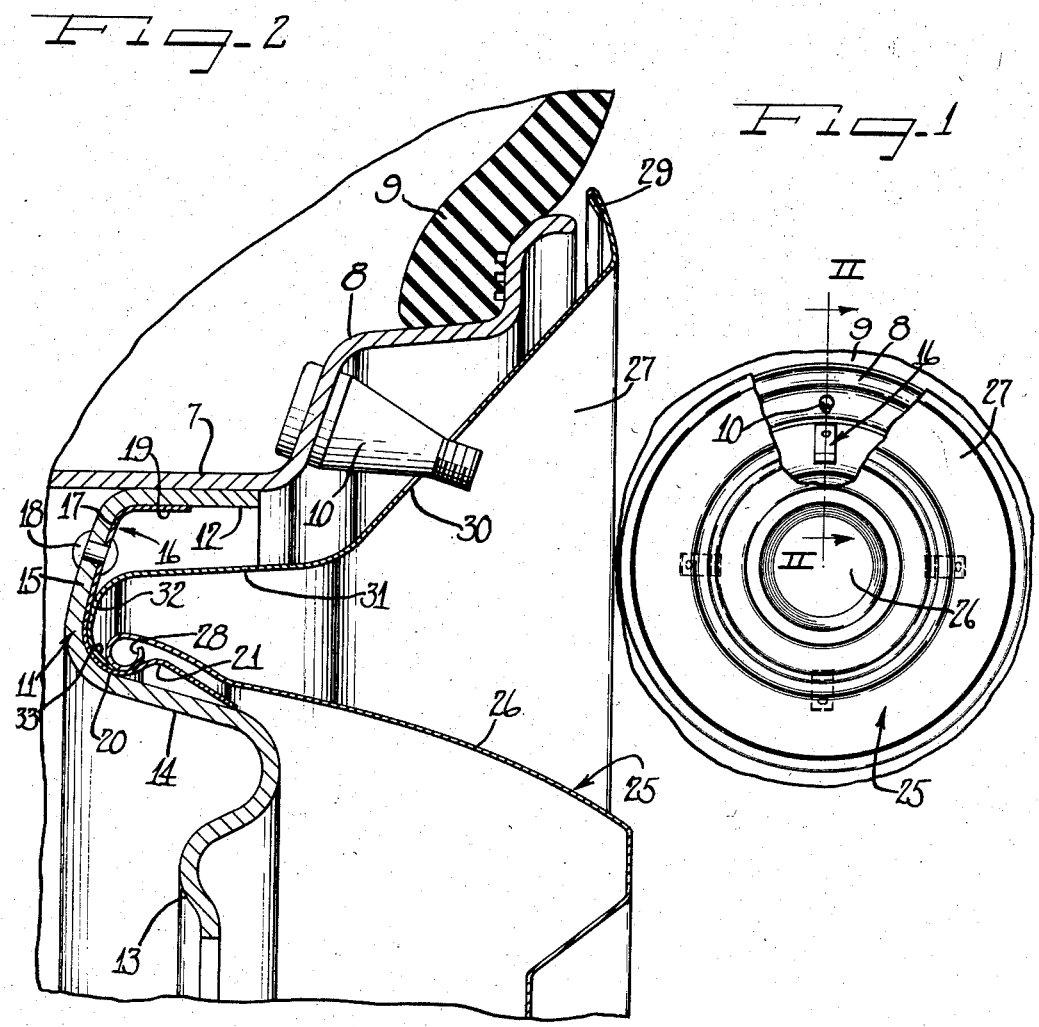
Inventor
George Albert Lyon _United States Patent Office_

2,883,239
Patented Apr. 21, 1959

2,883,239

WHEEL COVER

George Albert Lyon, Detroit, Mich.

Application June 2, 1955, Serial No. 512,786

12 Claims. (Cl. 301—37)

This invention relates to a wheel cover structure and more particularly to a multi-part cover assembly and novel means for retaining the same on the wheel.

The present tendency of automobile manufacturers to use relatively deeply dished ornamental cover structures for wheels has necessitated the provision of special retaining means for cooperation with the relatively deeply drawn cover parts.

It is an object of this invention to provide improved cover retaining means especially adapted for holding a composite multi-part cover structure assembly on the wheel inside of the tire rim and within the confines of the supporting body part.

Another object of this invention is to provide novel cover retaining means for clamping and detachably retaining a plurality of overlapped concentric cover parts on a wheel.

Still another object of this invention is to provide a novel cover structure made of a multiple of parts which lend themselves to economical manufacture on a large production basis from metal stampings.

In accordance with the general features of this invention, there is provided in a wheel cover structure, a wheel including a multi-flange tire rim and a body part with a bulge defining a radially outwardly facing shoulder inside of the rim, spaced cover retaining spring means on and backed up by the shoulder provided with radially outwardly projecting yieldable hump means, an annular trim ring extending radially and axially inwardly from the rim with an inner margin nested in the retaining means to the rear of the hump means and a central cover member having an outer turned edge resiliently snapped over and behind the hump means in clamping engagement with the ring inner margin.

Other objects and features of this invention may more fully appear from the following detailed description taken in connection with the accompanying drawings which illustrate a single embodiment thereof and in which—

Figure 1 is a side view of a wheel structure embodying my novel cover assembly with a portion of the assembly broken away to show one of the cover retaining spring clips; and Figure 2 is an enlarged fragmentary cross-sectional view taken on the line II—II of Figure 1 looking in the direction indicated by the arrows.

As shown on the drawings:

The reference character 8 designates generally a conventional multi-flange drop-center type of tire rim which supports, in the usual way, a pneumatic tire 9 which may be of either the tubeless or tube type as desired. A suitable valve stem 10 projects in the customary way from one of the flanges of the rim 8.

The tire rim is supported upon a dished metallic body member 11 attached to the base flange 7 of the rim by welding, riveting or other means (not shown). The body part has the usual and customary central bolt-on flange 13 by means of which it may be detachably secured in the customary way on an automobile axle.

The body part 11 includes an outwardly bulged inclined shoulder 14 which not only reinforces the body part, but also provides for the attachment of my novel wheel cover assembly to the wheel as shall be hereinafter described.

This inclined shoulder 14 is spaced from and cooperates with the outer flange 12 of the body part 11 so as to define a channel or groove having a bottom 15.

Secured in the bottom of the groove at spaced intervals is cover retaining means in the form of a plurality of spaced spring clips 16. Each clip is generally of a U-shaped cross-section and includes a base riveted at 18 to the base 15 of the body part groove, a leg 19 abutting a body part flange 12 and a retaining leg 20 bottomed on the inclined shoulder 14. The leg 20 includes an inclined or humped yieldable end 21 which is of an angular construction and is retainingly cooperable with the cover parts to be hereinafter described.

The cover assembly of my invention is designated generally by the reference character 25 and includes a relatively deeply dished central hub cap member 26 and a similarly deeply dished annular trim ring 27. Both of these parts may be made from metallic stampings. The central part 26 is of a configuration to cover the center of the wheel and may be suitably ornamented. The annular trim ring 27 has an outer turned marginal pry-off edge 29 which leads into an inwardly sharply inclined portion 30 over the flanges of the rim and terminating in an axial portion 31 projecting into the groove of the body part toward the bottom 15 thereof. The axial portion 31 is spaced from the hub cap so as to provide a very pleasing ornamental effect and also to enable access to the hub cap for the purpose of prying it off of the spring clips 16.

The axial portion 31 leads into a turned portion 32 bottomed against wheel body portion 15 and having a curled extremity 33 of a shape to nest inside of the spring clips behind the hump means 21 when the ring is on the wheel.

In the application of the cover to the wheel, the ring 27 is first pushed inwardly into the wheel until its turned inner margin 33 snaps over the spring clip humps 21 and is bottomed against the body part. Thereafter, the hub cap 25 is pressed axially into the wheel until its springy continuous outer edge 28 is likewise snapped over the spring clip humps 21 into clamping engagement with curled inner margin 33 of trim ring 27. It will be appreciated that in this mounting of the parts on the wheel, the spring clip humps 21 can yield and thereafter exert a retaining connection clamping both parts in overlapped nested relationship on the inclined shoulder 14 of the body part 11.

The hub cap 25 may be easily removed by inserting a suitable instrument under its turned edge 28 and by forcibly prying it off of the clips 16. Similarly, the trim ring 27 may be easily removed from the wheel by inserting a pry-off tool under its turned outer edge 29 and by thereafter forcibly prying the ring free of the clips.

By virtue of the trim ring 27 being spaced from the tire rim 8, air can freely flow behind the trim ring and into the center of the wheel. Also variations, due to allowable manufacturing tolerances, in the wheel are more readily accommodated as the cover assembly does not have to bottom on both the rim and body parts but only on body part 11.

The U-shaped or leg construction of each clip 21 is such as to resist turning of the clip especially as it is wedged in the body part groove.

It will be understood that modifications and variations may be effected without departing from the scope of the novel concepts of the present invention.

I claim as my invention:

1. In a wheel cover structure, a wheel including a multi-flange tire rim and a body part with a body part base flange connected to the rim and having an annular axially inwardly dished body part area adjacent thereto including a bulge defining a radially outwardly facing annular shoulder inside of the rim, spaced cover retaining spring means on and backed up by said shoulder provided with radially outwardly projecting yieldable hump means, an annular trim ring extending radially and axially inwardly from the rim with an inner margin telescoped into said annular dished body part area and nested to the rear of said hump means and a central cover member having an outer turned edge telescoped into said annular dished body part area and resiliently snapped over and behind said hump means in clamping engagement with said ring inner margin, said retaining means comprising spring clips circumferentially spaced about said annular shoulder and secured to said wheel body part, each clip being generally of U-shaped cross section and nestingly telescoped in said annular axially inwardly dished body part area with one leg of the clip engaged with a flange of the body part and with another leg of said clip carrying said hump means in proximity to said shoulder.

2. In a wheel structure, a wheel including a multi-flanged tire rim and a body part with a bulge defining a generally radially facing shoulder inside of the rim, spaced cover retaining means on said wheel comprising circumferentially spaced U-shaped clips including an axial leg bottom on said shoulder having a yieldable resilient hump portion offset radially of said shoulder, said hump portion being disposed axially inwardly of an outer tip end of said leg which is movable axially in response to the deflection of said resilient hump portion, an annular trim ring member extending radially and axially inwardly from the rim with an inner margin and a central cover member having an outer margin with said margins detachably engaged behind said yieldable resilient hump means in clamped engagement upon the wheel.

3. In a wheel structure, a wheel including a multi-flanged tire rim and a body part with a bulge defining a generally radially facing shoulder inside of the rim, spaced cover retaining means on said wheel comprising circumferentially spaced U-shaped clips including an axial leg bottomed on said shoulder having a yieldable resilient hump portion offset radially of said shoulder, said hump portion being disposed axially inwardly of an outer tip end of said leg which is movable axially in response to the deflection of said resilient hump portion, an annular trim ring member extending radially and axially inwardly from the rim with an inner margin and a central cover member having an outer margin with said margins detachably engaged behind said yieldable resilient hump means in clamped engagement upon the wheel, said spring clip including a base leg disposed behind said axial leg with said margin on said trim ring member bottomed thereagainst behind said hump portion.

4. In a wheel structure, a wheel including a multi-flanged tire rim and a body part with a bulge defining a generally radially facing shoulder inside of the rim, spaced cover retaining means on said wheel having yieldable resilient hump means on and backed up by said shoulder, an annular trim ring member extending radially and axially inwardly from the rim with an inner margin and a central cover member having an outer margin with said margins detachably engaged behind said yieldable resilient hump means in clamped engagement upon the wheel, said retaining means comprising spring clips circumferentially spaced about said shoulder and secured to said wheel body part, said clips having a resilient extremity engaged against and slidable along said shoulder in response to pressure against said hump means.

5. The wheel structure of claim 4 further characterized by said ring and central cover member comprising relatively deeply dished stampings with said ring inner margin and said cover member margin overlapping on said wheel body shoulder.

6. The wheel structure of claim 4 further characterized by said ring and central cover member comprising relatively deeply dished stampings with said ring inner margin and said cover member margin overlapping on said wheel body shoulder, said wheel body shoulder comprising a portion of an annular channel on said body part with said clip means being nested and engaged in assembly therein.

7. In a wheel structure, a wheel including a multi-flanged tire rim and a body part with a bulge defining a generally radially facing shoulder inside of the rim, spaced cover retaining means on said wheel having yieldable resilient hump means on and backed up by said shoulder, an annular trim ring member extending radially and axially inwardly from the rim with an inner margin and a central cover member having an outer margin with said margins detachably engaged behind said yieldable resilient hump means in clamped engagement upon the wheel, said retaining means comprising spring clips circumferentially spaced about said shoulder and secured to said wheel body part, said clips having a resilient extremity engaged against and slidable along said shoulder in response to pressure against said hump means, said shoulder comprising a side wall area of said annular dished area with said hump means and said extremity yieldable axially with respect to said side wall area and with said margins being annular and disposed in said annular dished area in assembly axially behind said hump means.

8. In a wheel structure, a wheel including a multi-flanged tire rim and a body part with a bulge defining a generally radially facing shoulder inside of the rim, spaced cover retaining means on said wheel having yieldable resilient hump means on and backed up by said shoulder, a dished cover structure disposed in overlying relation on the wheel having its dished area engaged behind the yieldable resilient hump means in clamped engagement upon the wheel, said retaining means comprising spring clips circumferentially spaced about said shoulder and secured to said wheel body part, said clips having a resilient extremity engaged against and slidable along said shoulder in response to pressure against said hump means.

9. The wheel structure of claim 8 further characterized by the body part being connected to said tire rim with said body part having an annular axially inwardly dished area disposed radially inwardly of the connection between the tire rim and the body part with the clips being mounted at circumferentially spaced intervals in the annular dished area.

10. In a wheel structure, a wheel including a multi-flanged tire rim and a body part with a bulge defining a generally radially facing shoulder inside of the rim, spaced cover retaining means on said wheel having yieldable resilient hump means on and backed up by said shoulder, an annular trim ring member extending radially and axially inwardly from the rim with an inner margin and a central cover member having an outer margin with said margins detachably engaged behind said yieldable resilient hump means in clamped engagement upon the wheel, said retaining means comprising spring clips circumferentially spaced about said shoulder and secured to said wheel body part, said clips having an angled terminal extremity disposed axially behind said hump means engaged against said shoulder providing a lead-in surface over which the outer cover margin may be deflected as it is urged over and beyond the hump means.

11. In a wheel cover structure, a wheel including a multi-flange tire rim and a body part with a body part base flange connected to the rim and having an annular axially inwardly dished body part area adjacent thereto including a bulge defining a radially outwardly facing annular shoulder on a radially inner side wall of the dished body part area in radial confronting relation to the body part base flange, spaced cover retaining spring means on and backed up by said shoulder provided with radially outwardly projecting yieldable hump means, an annular trim ring extending radially and axially inwardly from the rim with an inner margin telescoped into said annular dished body part area and nested to the rear of said hump means and a central cover member having an outer turned edge telescoped into said annular dished body part area and resiliently snapped over and behind said hump means in clamping engagement with said ring inner margin, said retaining means comprising spring clips circumferentially spaced about said annular shoulder and secured to said wheel body part, each clip being provided with a leg engaged with the body part base flange of the body part to resist turning of the clip.

12. In a wheel cover structure, a wheel including a multi-flange tire rim and a body part with a body part base flange connected to the rim and having an annular axially inwardly dished body part area adjacent thereto including a bulge defining a radially outwardly facing annular shoulder on a radially inner side wall of the dished body part area in radial confronting relation to the body part base flange, spaced cover retaining spring means on and backed up by said shoulder provided with radially outwardly projecting yieldable hump means, an annular trim ring extending radially and axially inwardly from the rim with an inner margin telescoped into said annular dished body part area and nested to the rear of said hump means and a central cover member having an outer turned edge telescoped into said annular dished body part area and resiliently snapped over and behind said hump means in clamping engagement with said ring inner margin, said retaining means comprising spring clips circumferentially spaced about said annular shoulder and secured to said wheel body part, said trim ring including an axial portion extending into the dished area and a hooked end connected at its axially inner end which axial portion is spaced radially of said hump means with said hooked end engaged therebehind and with said outer terminal edge on the central cover member extending into the dished area bearing against said hooked end axially spaced from said axial portion on said trim ring.

References Cited in the file of this patent

UNITED STATES PATENTS

| | | |
|---|---|---|
| 2,304,583 | Lyon | Dec. 8, 1942 |
| 2,343,070 | Lyon | Feb. 29, 1944 |